Figure 1:
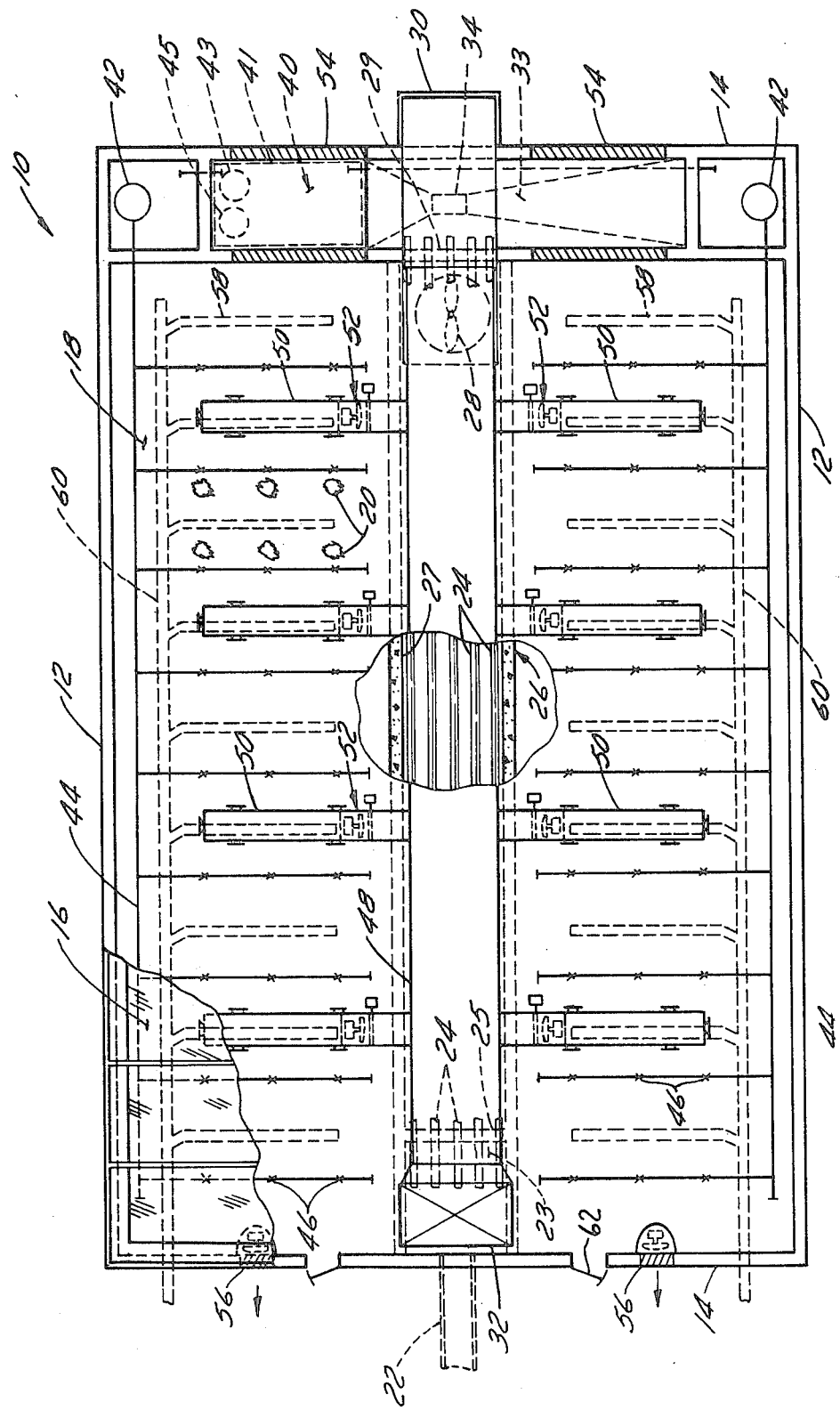

United States Patent [19]

Brais

[11] 3,999,329
[45] Dec. 28, 1976

[54] APPARATUS AND METHOD FOR TREATING FLUE GAS AND PASSING TREATED CONSTITUENTS INTO GREENHOUSE

[76] Inventor: Joseph Jean Pierre Brais, 159 Gardenville, Longueuil, Quebec, Canada

[22] Filed: Nov. 22, 1974

[21] Appl. No.: 526,308

[30] Foreign Application Priority Data
May 13, 1974 United Kingdom ............ 21033/74

[52] U.S. Cl. ..................................... 47/17; 55/68; 55/222; 55/269; 55/385 R; 261/17
[51] Int. Cl.² ......................................... A01G 9/00
[58] Field of Search .......... 55/222, 68, 269, 385 R; 261/17; 47/17, 58

[56] References Cited
UNITED STATES PATENTS

| | | | |
|---|---|---|---|
| 584,344 | 6/1897 | Gerardin et al. ..................... | 55/222 |
| 1,297,639 | 3/1919 | Blumenberg, Jr. .................. | 55/222 |
| 1,471,112 | 10/1923 | Ellis .................................... | 55/222 |
| 1,826,607 | 10/1931 | Eiben ................................... | 47/17 |
| 1,939,015 | 12/1933 | McLellan ............................. | 47/17 |
| 2,855,725 | 10/1958 | Carothers ............................ | 47/17 |
| 3,063,195 | 11/1962 | Ravich ................................. | 47/17 |
| 3,409,409 | 11/1968 | Sackett, Sr. ......................... | 55/68 |

FOREIGN PATENTS OR APPLICATIONS 1,070,439  12/1959  Germany ............................. 47/17

*Primary Examiner*—Bernard Nozick
*Attorney, Agent, or Firm*—Ian Fincham; Stanley D. Schwartz

[57] ABSTRACT

A method of producing an atmosphere suitable for plant growth and providing an atmosphere comprising the steps of supplying hot flue gases, cooling the flue gases to condense the water vapor contained therein, allowing said condensed water vapor and the flue gases to remain in intimate admixture for a time period sufficient for the condensed water vapor to absorb at least a portion of the flue gases and promote inter-reaction, spraying the condensed water vapor within a substantially enclosed chamber, and passing the non-absorbed portion of the flue gases through said chamber at a relatively low velocity. There is also disclosed an apparatus adapted to carry out the method of the present invention.

18 Claims, 1 Drawing Figure

APPARATUS AND METHOD FOR TREATING FLUE GAS AND PASSING TREATED CONSTITUENTS INTO GREENHOUSE

This invention relates to a method and an apparatus and more particularly, relates to a method suitable for treating flue gases and an apparatus adapted to carry out the method of the invention.

One of the most useful forms of energy is electric energy which is widely used in modern society. Means of generating the electric energy include nuclear means, hydroelectric means, and the thermal combustion of various fuels such as, for example, natural gas, coal, oil, peat, bagasse, refuse, etc.

The two most efficient and relatively non-polluting methods utilize the above-mentioned nuclear means and hydroelectric means. However, the feasibility of both of these methods for the generation of large amounts of electric energy is limited due to the lack of suitable sites for hydro-electric generating plants ad the safety factor of the nuclear means.

Power plants generating electricity from the burning of such fuels as mentioned above have a relatively low efficiency coupled with a high rate of pollution. For example, it has been shown that presently operating power generating plants which utilize coal as a fuel produce approximately a kilowatt hour or 3413 btu's from a pound of coal which may contain 12,500 btu's for an overall efficiency of approximately 27%.

In order to obtain the 3413 btu's this same pound of coal will give off some 13 pounds of combustion gas containing over 20% $CO_2$, 5% water vapor, sulphur oxides, nitrogen oxides and fly ashes. A large power generating station using coal and having a 2,000 megawatts capacity means that up to 10,000 tons of coal may be burned a day. As may be seen, the smoke stacks of such power generating plants will discharge tremendous amounts of pollutants to the atmosphere in the form of sulphur oxides, nitrogen oxides and fly ashes.

Such a plant may, in a single day, pump out to the atmosphere some 250 tons of particulate matter, 236 tons of sulphur dioxide, and 240 tons of nitrogen oxide. In addition, such a plant will produce from 24,000 tons of carbon dioxide and 500 tons of water in the form of water vapor. In addition to these combustion by-products, this same plant could utilize up to 1800 tons of oxygen during each hour of operation. As may be appreciated, this tremendous generation of pollutants can change the ecological balance of both the atmosphere and surrounding area.

Despite the above disadvantages, the use of fossil fuels such as coal for the generation of energy has become of increasing importance due to its relatively low economic cost. However, in the utilization of fossil fuels it is desirable to minimize the amount of pollutants discharged to the atmosphere which could effect the ecological conditions of the region.

In this respect the ecological conditions prevailing in our geological era are a result of the gradual absorption of carbon dioxide by vegetable matter through the process of photosynthesis and by mineralization. Through the life and mineral cycle of our planet, the original atmosphere has been depleted of vast amounts of carbon dioxide which has been stored in the biomass, the fossil fuel reserves (in the form of organic carbon compounds), and in the mineral deposits of the carbonate family. The carbon content of this mass was originally in the atmosphere and the ratio of carbon dioxide therein was much higher than it is at the present time.

Massive combustion of fossil fuels releases to the atmosphere vast amounts of carbon dioxide and other chemical elements mentioned above, which, have in earlier geological eras combined to produce fossil fuels under ecological systems and conditions different from those existing at the present time.

In the present state, a minimum equilibrium now exists with the atmosphere carbon dioxide being regenerated by the processes of fermentation and oxidation of decaying biomass and being reabsorbed by the living portion of earth biomass.

It is therefore an object of the present invention, to provide a method suitable for the treatment of waste flue gases which will reduce the spread of pollution components.

It is a further object of the invention to provide a method for the treatment of waste flue gases which will utilize the pollution components formed as a result of fossil fuel combustion, such as coal, as a basic raw material to promote growth of vegetable biomass.

A still further object of the invention, is to provide a method of transforming arid soil into productive agricultural soil and using waste flue gases under ecological conditions different from those which presently exist in the earth atmosphere, but existed in earlier geological periods of greater fertility to give a greater yield of vegetable matter and a partial oxygen regeneration.

A further object of the present invention is to provide an apparatus adapted to carry out a method of treating flue gases and which apparatus utilizes the components of flue gases to promote vegetable biomass growth and reduce the spread of flue gas components.

Generally, according to one aspect of the present invention and more particularly, to the method aspect thereof, there is provided a method of producing an atmosphere suitable for plant growth and providing an atmosphere comprising the steps of supplying hot flue gases, cooling the flue gases to condense the water vapor contained therein, allowing said condensed water vapor and the flue gases to remain in intimate admixture for a time period sufficient for the condensed water vapor to absorb at least a portion of the flue gases and promote inter-reaction, spraying the condensed water vapor within a substantially enclosed chamber, and passing the non-absorbed portion of the flue gases through said chamber at a relatively low velocity.

According to the apparatus aspect of the present invention, there is provided an apparatus suitable for treating hot flue gases containing water vapor from a source thereof, the apparatus comprising a substantially enclosed chamber, heat exchanger means, flue gas inlet means to said heat exchanger means, said heat exchanger means being adapted to cool the flue gas from said flue gas inlet means and condense the water vapor contained therein, means permitting said cooled flue gases to enter said enclosed chamber and pass therethrough, means to spray said condensed water vapor within said chamber, and means for removing the gases from said chamber after said gases have passed therethrough.

In greater detail, the flue gases which are to be treated may be characterized as being the combustion by-products of various fuels. In this respect, the flue gases may be the by-products resulting from the combustion of fuel such as natural gas, coal, oil, peat, bagasse, refuse, etc. It is also to be noted that apart from the gaseous by-products of the in flue gases, they may also contain particulate matter such as fly ashes or the like. The flue gases, with appropriate treatment, may be those generated as by-products by the combustion of any combustible material in large quantities such as are generated by certain thermal power generating stations or industrial processes.

In one particular embodiment, the flue gases are those resulting from the combustion of coal which was originally formed as a result of natural forces and processes on the raw biomass of past geological eras.

The combustion of coal releases by-products in the gaseous state containing mainly the coal chemical elements - i.e. carbons, sulphur, and the combustion air components, i.e. oxygen, nitrogen, and water vapor. Particulate matter in the solid state is also entrained in the flue gases and which particulate matter contains potassium, magnesium and calcium in the form of oxides and traces of mineral elements of the original biomass. The particulate matter usually comprises light ash which is entrained with the gase and contains the alkalies. The various impurities and the heavier particulate matter along with the uncombustible material contained in the coal such as $Al_2O_3$, $SiO_2$, etc. are usually collected in the slag as a result of the combustion process and do not escape in the flue gases.

As aforementioned, according to the apparatus aspect of the present invention, there are provided greenhouse means having vegetation biomass growing means therein. The greenhouse means generally comprise one or more greenhouses of a sealed type building to which the flue gases pass in a manner to be discussed hereinafter. The number and size of greenhouses will naturally vary depending upon the volume of flue gases to be handled by the system. Thus, for example, a substantially rectangular greenhouse having 5,000 square feet of vegetation biomass growing area within may handle up to 5,000 cubic feet per minute of flue gases generated by the combustion processes. It is preferred that when a single inlet for the flue gases is provided, that the greenhouse be of an elongated structure so as to allow a relatively low velocity flow of flue gases therethrough whereby some of the constituents of the flue gas may be absorbed by the biomass material and to allow the settling of the fine particulate matter carried by the flue gases.

Under normal present day atmospheric conditions, the air contains approximately 0.03% by volume of carbon dioxide. Compared with this small amount, 40 to 45% of the dry weight of vegetable matter is the element carbon. It therefore becomes obvious that an enormous volume of atmospheric air must be depleted of carbon dioxide to supply the necessary carbon for the vegetable biomass. The rate at which the carbon dioxide can be delivered to the plants and absorbed by them is therefore a predominantly limiting factor upon their rate of growth under normal circumstances. However, vegetable biomass can effectively utilize carbon dioxide in much greater concentration than is provided by nature and it is this fact which permits a concentration range from 10 to 100 times that of the atmosphere for which substantially increased dry weight yields will be produced.

It has been recognized that an improved growth process is made possible whereby forced growth conditions are provided which maintain high carbon dioxide content, high humidity, high light intensity and an improved plant nutrient mixture. In this respect, it is known that the rate of photosynthesis is increased by increased temperature just as any other chemical reaction is increased provided that no other parameter is a limiting factor. With the present invention, there is provided a high carbon dioxide content, a high humidity and increased temperatures. In addition, there may optionally be provided by means described hereinafter an improved plant nutrient mixture which may contain any nutrients lacking from the method of the present invention. The basic normally required nutrients are such elements as nitrogen, potassium, phosphors, etc.

The greenhouse, subject to the above conditions, may be of any suitable structure and in the preferred embodiment, incorporates therein at least portions of a transparent material which will allow a higher ratio of ultraviolet rays and a lower ratio of infrared rays absorption. In this respect, the roof and at least portions of the side walls may be of such a transparent material; such materials are well known to those skilled in the art and may include fiberglass material, glass, various plastic materials, etc.

The greenhouse will also, when operational, include means for supporting the vegetable biomass and such means can be of any material which is suitable for growth of the type of plants of algae within the greenhouse. Such materials may include any soil material such as earth, sand, mulch, etc. The soil material may, in one embodiment, be the natural soil material of the area on which the greenhouse is placed. Alternatively, and for some embodiments, a specially prepared soil mixture may well be utilized.

The apparatus of the present invention incorporates flue gas inlet means adapted to receive the heated flue gases from a source thereof. The flue gases may be transferred to the inlet means by any suitable device well known to those skilled in the art. In the preferred embodiment, the flue gas inlet means are situated below ground level for reasons which will become clear hereinafter.

The flue gases coming from the source thereof and being delivered to the flue gas inlet means are at an elevated temperature, the exact temperature depending on the process producing the flue gases, the distance the flue gases are transported, etc. In a typical embodiment, the flue gases would be at a temperature in the range of between 300° and 400° F. After passing through the flue gas inlet means, the apparatus includes heat exchanger means to cool the flue gases to a point at which at least some of the water vapor contained within the heated flue gas condenses. Many conventional heat exchanger arrangements are known and could be adapted to the apparatus of the present invention subject to various parameters to be mentioned hereinafter.

In a preferred embodiment, the heat exchange means run beneath the greenhouse to which the flue gases are supplied and comprise a shell encompassing a plurality of conduits. In this embodiment, the heated flue gases are supplied to the conduits which are of a suitably inert material resistant to the chemical effects of the flue gases. The cooling of the heated flue gases is accomplished by passing a cooling medium around and about the conduits within the shell. Any suitable cooling medium may be used and in the preferred embodiment and for purposes of expediency, air may be employed; the air being passed through the shell around and about the conduits containing the heated flue gases in a direction opposed to the direction of flow of the flue gases. As aforementioned, the conduits are of a suitably inert material such as vitrified clay, ceramic material, glass, various plastic materials, etc. The shell about the conduits may be of a poured concrete or the like. It is characteristic of the construction of the condenser and heat exchanger means of the present invention that a relatively slow dissipation of the heat from the flue gases is desirable. This permits the flue gases to remain in admixture with the condensed water for a longer period of time is normally associated with the standard type of heat exchanger, the longer period of time resulting in a greater absorption of the flue gases and solubility by the condensed water vapor and a greater chemical reaction with the particulate matter. The construction of such a condenser and heat exchanger means may be varied by those skilled in the art upon a reading of the teachings of the present invention. Similarly, the temperature to which the flue gases are cooled will depend upon those parameters well known — in the preferred embodiment, the flue gases may be cooled to a temperature of below 100° F.

The conduits which the flue gases enter would be sloped in the direction of flow of the flue gases entering the flue gas inlet means for reasons to be discussed hereinafter. The cooling medium, which in the above embodiment is air, may then be discharged through a suitable air outlet at the end opposed to which the air enters. The heated air may, if desired, be used for other purposes or simply discharged into the atmosphere; it does not come into contact with the flue gases and thus does not contain any pollutants.

The condensed water vapor absorbs and dissolves acid vapors and some of the soluble gases and also mixes with the particulate matter including the alkaline ashes. This turbulent mixture will then produce a slurry in which the dissolved acids and the alkaline ashes combined and partially neutralize each other. The normal weight ratio of ashes to condensed water, in the above described embodiment, is in the order of 1:20 and the normal weight ratio of $SO_x$ and $NO_x$ acids to ashes is in the range of 2:1. If desired, a greater ratio of fly ashes could be allowed to escape from the combustion process into the flue gas stream to increase neutralization.

The slurry comprising the dissolved acids and fly ashes and the gases and unslurried fly ashes are then discharged into a suitable plenum. The aforementioned gases and unslurried fly ashes are separated from the slurry and allowed to escape to the greenhouse as will be discussed in greater detail hereinafter.

The aqueous slurry could then be utilized for spraying on the vegetable biomass within the greenhouse. However, in the preferred embodiment, the slurry is further treated before being utilized for such purposes.

From the plenum, the aqueous slurry may be transferred to a reservoir by suitable pump means wherein the aqueous slurry is processed and treated. Treatment of the aqueous slurry may include the addition of chemical compounds and nutrients desirable for the growth of the vegetable biomass in the greenhouse. The specific nature of the chemical additives will depend on various parameters and may be adjusted by those skilled in the art. Thus, for example, agents may be added to adjust the pH of the aqueous slurry as well as adding nutrients for the promotion of plant life growth. The nutrients will vary depending on the combustible product producing the flue gases as well as the nature of the vegetable biomass. The aqueous slurry may go through a number of such treatment steps as desired.

After passing through the treatment means, the aqueous slurry will then be transferred to means adapted to spray the same on the vegetable biomass and soil. Preferably, the treated slurry is transferred to a plurality of overhead conduits from where it may be sprayed. This has the advantage of removing any particulate matter and especially the unslurried fly ash which is passed through the greenhouse. Alternatively, the treated slurry could be placed in contact with the vegetable biomass by conventional irrigation methods.

After passing though the heat exchanger and condenser means, the cooled flue gases and the aqueous slurry are separated as aforementioned. The cooled flue gases which contain a high percentage of carbon dioxide relative to the normal percent of carbon dioxide in the atmosphere are passed over and through the greenhouse containing the vegetable biomass growing means. Preferably, the cooled flue gases are allowed to move the length of the greenhouse at a sufficiently low velocity to permit the absorption of carbon dioxide by the vegetable biomass. Fan means or the like may be utilized in transferring the cooled flue gases from the heat exchanger means to the greenhouse. After passing through the greenhouse, the flue gases are then discharged to the atmosphere. It should be noted that the cooled flue gas is saturated with water vapor to supply sufficient humidity for the maximum promotion of plant growth. The gases discharged from the greenhouse are substantially purified and enriched with oxygen from the discharge of the same from the vegetable biomass.

The condensed water is allowed to filter through the soil in which the vegetable biomass grows. The nutrients contained therein are absorbed by the plant growth and depending upon the quantity placed thereon, there may be provided drain means underneath the soil to collect the substantially purified and filtered water. This water may then be transferred to a suitable storage means whereafter it may utilized as desired or, to spray on the vegetable biomass if so desired.

The apparatus of the present invention may also utilize temperature control means for maintaining the optimum temperature for promotion of plant growth within the greenhouse. Thus, for example, heater units may be provided which are adapted to maintain a certain desired temperature therein. Similarly, there may be provided means for allowing the ingress of atmospheric air into the greenhouse for purposes of cooling and/or maintaining desirable conditions.

There may also be supplied supplementary light means to aid in the maximum growth of the vegetable biomass. Such light means are well known to those skilled in the art and need not be elaborated on herein.

The neutralized fly ash and particulate matter falling on the greenhouse bed has been found to act as mulch and fertilizer. In this respect, the deposits of such fly ashes and particulate matter may add 3 to 6 inches a year to the soil bed in the embodiment described above. By so doing, a considerable reclamation of land previously considered undesirable for plant growth may be achieved. The process and apparatus of the present invention provides optimum growth conditions for the vegetable biomass and returns to the atmosphere and to the soil many of the basic constituents which have been removed therefrom.

Having thus generally described the invention, reference will be made to the accompanying drawings illustrating a preferred embodiment thereof, and in which:

FIG. 1 is a plan view of the modular flue gas reclaim apparatus.

In the drawings, a modular flue gas reclaim apparatus is shown in FIG. 1 and as may be seen, includes a greenhouse generally designated by reference numeral 10 which is adapted to receive flue gases from a source thereof.

Greenhouse 10 is a substantially rectangular unit having side walls 12, end walls 14 and a roof structure 16. The dimensions of greenhouse 10 will vary according to the volume of flue gases which it is required to handle; for purposes of illustration, FIG. 1 shows a greenhouse having sufficient capacity to handle 5,000 cubic feet per minute of flue gases and which may typically have dimensions of 100 by 50 feet.

Roof structure 16 is of a transparent material to allow natural light to pass therethrough and preferably is of such a material which will permit a higher ratio of ultraviolet ray absorption and a lower ratio of infrared ray absorption. Such materials may be chosen from those well known to those skilled in the art and possessing the desired properties. Side walls 12 and end walls 14 may be of any conventional structure and materials and may include windows (not shown) of a material similar to that forming roof structure 16.

Greenhouse 10 encloses a ground level 18 which, as shown in FIG. 1, has plant growth 20 therein. The soil material, depending upon the location of greenhouse 10, may be the natural soil material of the region and/or may include any material suitable for the growth of plants or algae such as earth, sand, mulch, etc.

Situated at one end of greenhouse 10 and below ground level 18, an inlet conduit 22 is connected to the source of flue gases which may be, for example, flue gases from a thermal power generating station utilizing coal. Any conventional means of joining inlet conduit 22 to the source of flue gases may be utilized; inlet conduit 22 is of a material inert to any corrosive/thermal effects of the flue gases.

Inlet conduit 22 is operatively associated with a plenum of shell 23. At one end of shell 23, inlet conduit 22 permits the introduction of flue gases thereto. At the opposed end, a plurality of conduits 24 extend through a wall 25 permitting the flue gases to enter conduits 24. Cylindrical conduits 24 are of a chemically inert material such as vitrified clay, ceramic, glass, fiberglass, or other well known materials which are adapted to resist the corrosive effects of the flue gases. As shown in FIG. 3, conduits 24 form part of a heat exchanger and condenser unit 26 and are in a spaced apart relationship surrounded by shell 27 which may be of a poured concrete or other suitable material. Also, cylindrical conduits 24 are sloped downwardly from the inlet end to the opposed end of greenhouse 10.

A fresh air inlet 30 forms a passage connecting the exterior environment of greenhouse 10 and the space enclosed by shell 27. Situated within the passage is a fan 28 adapted to direct air drawn from outside greenhouse 10 into shell 27. An outlet comprising a chimney structure designated generally by reference numeral 32 is in communication with shell 27 at the end opposed to fan 28.

Cylindrical conduits 24 extend the length of shell 27, pass through a wall 29 and discharge into a chamber 33. outlet 34. A treatment cell (not shown) is adapted to receive a condensed slurry from chamber 33 through outlet 34 and may comprise, for example, filtering means, settling means, and the like..

A further source of treatment of the slurry comprises a chemical feed and mixing unit 40 to which the slurry is transferred by suitable means (not shown). Chemical feed and mixing unit 40 comprises a reservoir or like retaining means 41 for adding to the slurry desired chemicals or other commodities. Suitable feed means 43 may be associated with the chemical feed and mixing unit as well as agitator means and the like 45. Chemical feed and mixing unit 40 may be adapted to treat the slurry on either a batch or continuous flow basis, both of which are well known to those skilled in the art.

Transfer pumps 42 are operatively associated with chemical feed and mixing unit 40 whereby liquid may be transferred therefrom to a plurality of conduits generally designated by reference numeral 44.

Conduits 44 are mounted in a spaced apart manner above ground level 18 of greenhouse 10 and include nozzles 46 mounted therein at spaced apart intervals.

The interior of greenhouse 10 also includes a duct 48 operatively associated with air inlet 30 discussed above. Extending from duct 48 which runs longitudinally through greenhouse 10 are a plurality of smaller ducts 50 which contain heating units 52.

At the end of greenhouse 10 containing chambers 33 a plurality of inlet grilles 54 are mounted in end wall 14. Also, at least one air outlet 56 is provided in the opposed end wall.

Beneath ground level 18, as shown in FIG. 1, drainage means for the soil are provided and which comprise a plurality of collecting conduits generally designated by reference numeral 58. These collecting conduits 58 lead to a further main conduit 60 which, in turn, may connect with a suitable storage tank (not shown).

A plurality of access means comprising doors 62 may be provided to allow ingress and egress to the various components of the apparatus of the present invention.

According to the method aspect of the invention, flue gases enter inlet conduit 22 and may be assisted by means of a fan (not shown) or other like means. These flue gases contain various components and for example, in the embodiment wherein the flue gases are those of a thermal power generating station utilizing coal, a typical flue gas entering conduit 22 may contain 20.85% of $CO_2$, 70.14% of $N_2$, 4.98% of $H_2O$, 2.55% of $O_2$, 0.24% of $SO_x$ and 0.24% of $NO_x$. The temperature of the flue gases will depend upon the distance between the source and the inlet conduit 22 as well as the process generating said flue gases.

The flue gases from inlet conduit 22 enter plenum 23 from where they commence their passage through cylindrical conduits 24. The configuration and materials employed in the construction of conduit 24 are such so as to provide a relatively low heat transfer capacity as compared to normal heat exchange structures whereby the components of the flue gas are kept in contact for a relatively long time. As cooling air from inlet means 30 pass around and about conduits 24, the water vapor contained in the flue gases is condensed. After performing its function as a cooling medium, the air passed through shell 27 is then discharged through chimney structure 32.

As the water vapor contained in the flue gases condenses within conduits 24, it absorbs and dissolves at least a portion of the acid vapors ($SO_x$ and $NO_x$) and portions of soluble gases $CO_2$ and $O_2$, and mixes with the alkaline ashes contained within the flue gases. The turbulent mixture produces a slurry in which the dissolved acids and the alkaline oxides combine and partially neutralize each other. In this respect, the normal weight ratio of ashes to condensed water, in the above described set up, is in the order of 1:20 and the normal weight ratio of $SO_x$ and $NO_x$ acid vapors to ashes is in the range of 2:1. If desired, a greater ratio of fly ashes could be allowed to escape into the flue gas stream to increase neutralization.

As aforementioned, cylindrical conduits 24 are sloped in the direction of flow of the flue gases whereby the slurry, undissolved gases, and unslurried fly ashes are discharged in chamber 33. The undissolved gases and unslurried fly ashes are then passed through the greenhouse as will be discussed in greater detail hereinafter.

From chamber 33 the slurry is transferred to treatment cell 38 which may include means for treating the condensate of slurry as desired.

As aforementioned, a chemical feed and mixing unit 40 is provided in the preferred embodiment and includes means for adding to the slurry desired chemicals and the like. In this respect, the pH of the slurry containing condensed water vapor may be adjusted to a desired level; other commodities such as various nutrients may also be added to the condensate. From chemical feed and mixing unit 40 the treated slurry is then transferred via transfer pump 42 to conduits 44. The treated slurry is then sprayed through nozzles 46 on plant growth 20.

Plant growth 20 may be any suitable vegetation and/or algae adapted to best utilize the environmental conditions of greenhouse 10.

Any excess of the slurry which is not utilized by plant growth 20 will filter through the soil and will be recovered by collecting conduits 58. The substantially purified water collected by conduits 58 is transferred to conduit 60 which may lead to a storage means for the purified water. The water thus collected may be utilized for any desired purpose and may be fed back to plant growth 20 if desired.

As discussed above, the slurry discharged from conduits 24 are fed to a treatment cell. The undissolved flue gases which contain a predominance of $CO_2$ and the unslurried fly ashes are also discharged from conduits 24 and allowed to escape into greenhouse 10 through ducts 50. To this end, means (not shown) may be incorporated in the apparatus to assist in the flow of the cooled gases and unslurried fly ash through ducts 50 from where they pass over filtering and growing bed 18. While passing over filtering and growing bed 18, a substantial portion of the carbon dioxide is absorbed by plant growth 20. Unslurried fly ash carried by the cooled gases also passes through the greenhouse where the low velocity and spraying action from nozzles 46 helps to deposit the same on the growing bed. As such, neutralized fly ash falling on the bed will act as a mulch and fertilizer and will assist in building up the soil bed. After passing through greenhouse 10, the treated gases enriched with oxygen will be discharged through outlet grill 56.

To maintain a suitable temperature within greenhouse 10, cool air from outside greenhouse 10 or recirculated air may be transferred through ducts 48 and 50. The air passing therethrough may be heated as desired by heating units 52. Furthermore, auxiliary light means (not shown) may be provided in greenhouse 10 to provide a controlled environment.

A large percentage of the cooled flue gases supplied to greenhouse 10 comprises carbon dioxide and the importance of such carbon dioxide to plant growth must be emphasized. As discussed above, atmospheric air contains only a small percentage by volume of carbon dioxide yet 40 to 45% of the dry weight of vegetable matter is the element carbon.

Modern atmosphere has been largely depleted of carbon dioxide and modern soil lacks a great amount of its basic salts. Utilizing the above described method and apparatus of the present invention, many of the disadvantages inherent in prior art pollution control systems are overcome. The ecology inside the modular greenhouse unit above described may be said to be near to that of a Pennsylvanian era. Primitive marshland plants and algae could well be utilized as plant growth in a greenhouse modular unit as these algae or plants have a much faster rate of growth and a much larger capacity of carbon dioxide absorption and $O_2$ release. Furthermore, they also yield a far greater proportion of proteins compared to normal expectations of plant growth.

The advantages of using a higher carbon dioxide content in a greenhouse atmosphere are well known. The most common source of carbon dioxide is combustion and utilizing the present invention, not only will pollution be controlled but the massive use of all the constituents of flue gases may be employed. This is to be compared to normal flue gas treatment wherein fly ashes are separated from the gas in a dry state above the dew point of the water vapor contained in the flue gas. The mass of alkaline ashes and the water which could be used to neutralize the acid radicals contained in the gas mass is completely wasted, and this continues to be so as the separation processes for the fly ashes are increased in efficiency.

In addition to the advantages gained by the treatment of normally polluting flue gases and the higher productivity of plant growth within the modular greenhouse unit, it has been found that the fly ashes deposited on the growing bed may add up to six inches of soil each year. Obviously, the apparatus and the method of the present invention could well be utilized to reclaim previously arid and barren land.

It is to be recognized that the above described embodiment is a preferred embodiment only and that many changes and modifications will become apparent to those skilled in the art upon a reading of the disclosure herein without departing from the spirit and scope of the invention. The invention is not limited by the above described embodiment, but rather by the claims appended hereto.

The embodiments of the invention in which an exclusive property or privilege is claimed are defined as follows:

1. An apparatus suitable for treating hot waste flue gases containing water vapor and fly ash and utilizing the same for the promotion of vegetation growth the apparatus comprising a substantially enclosed greenhouse having a bed of vegetation growth therein, heat exchanger means, a flue gas inlet communicating with said heat exchanger means for the entry of said hot waste flue gases thereto, said heat exchanger means being adapted to cool the flue gas from said flue gas inlet to a temperature sufficient and condense the water vapor contained therein, said heat exchanger means having a low heat transfer capacity whereby said condensed water vapor and the flue gases remain in intimate contact for a time period sufficient for at least a portion of said flue gases and fly ash to be absorbed by said condensed water vapor and to permit the components of the flue gas and condensed water vapor to interreact to form a slurry, conveying means communicating with an outlet of said heat exchanger means and distributing means permitting the unreacted portion of said cooled flue gases, which contain a high percentage of $CO_2$, in said greenhouse and pass therethrough at a relatively low velocity in contact with the vegetation bed, means to remove said slurry from said heat exchanger means and spray said slurry on said vegetation growth within said greenhouse, and means for removing the cooled flue gases from said chamber after said flue gases have passed therethrough.

2. The apparatus of claim 1, wherein said heat exchanger means comprises a plurality of conduits through which said heated flue gases pass, said conduits being encased in a shell, and means for passing a cooling medium through said shell proximate said conduits.

3. The apparatus of claim 2, wherein said means for passing said cooling medium through said shell comprises means for passing the cooling medium in a direction opposed to the direction of flow of the flue gases in said conduits.

4. The apparatus of claim 3, wherein said conduits are sloped in the direction of said flue gas flow such that the slurry flows to said spray means.

5. The apparatus of claim 3, wherein said conduits are of such a length and said cooling fluid is at such a temperature so as to cool said flue gases to a temperature of below 100° F, condense a substantial portion of said water vapor, and dissolve a portion of acid gases, thus forming a slurry with fly ashes and promote neutralization of acid solution with the alkaline fly ash component thereof.

6. The apparatus of claim 5, wherein said cooling fluid is air, the apparatus including discharge means for discharging said air to the atmosphere after passing through said shell.

7. The apparatus of claim 1, additionally comprising treatment means to treat said slurry before said slurry is passed to said spray means.

8. The apparatus of claim 7, wherein said treatment means includes chemical feed means.

9. The apparatus of claim 8, wherein said chemical feed means includes means for adjusting the pH of said slurry.

10. The apparatus of claim 7, wherein said spraying means includes a plurality of conduits disposed above said vegetation growth, and pump means associated therewith for transferring said slurry from said treatment means to said conduits.

11. The apparatus of claim 10, including collection means, said collection means being disposed under said vegetation growing means so as to collect any excess of said treated water condensate after passing through said vegetation growth.

12. The apparatus of claim 11, including cool air inlet means, said cool air inlet means adapted to permit the ingress of cool air from outside said greenhouse to inside said greenhouse to control the temperature thereof.

13. The apparatus of claim 12, including heating means, said heaing means adapted to control the temperature of the gaseous interior of said greenhouse.

14. A method of treating flue gases having fly ash entrained therein to remove pollutants and use the flue gases to produce an atmosphere suitable for plant growth, comprising the steps of cooling the flue gases to condense at least a portion of the water vapor contained therein, allowing said condensed water vapor and the flue gases to remain in intimate admixture for a time period sufficient for the condensed water to absorb at least a portion of the flue gases and fly ash and promote inter-reaction therebetween to thereby form a slurry, separating slurry and unreacted flue gases, spraying the slurry containing said absorbed flue gases and fly ash within a substantially enclosed greenhouse having vegetation growth therein, and passing the non-absorbed portion of the flue gases containing a high percentage of $CO_2$ through said chamber at a relatively low velocity in contact with the vegetation bed to permit said vegetation growth to utilize said $CO_2$ and to deposit a further portion of entrained fly ash on said vegetation growth.

15. The method of claim 14 including the step of chemically treating said slurry and adjusting the pH of the condensed water vapor.

16. The method of claim 14 wherein the step of cooling the flue gases includes the step of cooling the flue gases in a heat exchanger by passing the flue gases through a plurality of conduits, said conduits being encased in a shell, and passing a cooling fluid through said shell proximate said conduits in a flow direction opposite to that of the flow direction of said flue gases.

17. The method of claim 16, wherein the step of passing cooling fluid through said shell comprises the step of passing air through said shell and cooling said flue gases to a temperature of below 100° F.

18. The method of claim 17, including the step of exhausting said cooled flue gases from said greenhouse after passing the flue gases over the vegetation growth.

* * * * *